US012017653B2

(12) United States Patent
Jeon et al.

(10) Patent No.: US 12,017,653 B2
(45) Date of Patent: Jun. 25, 2024

(54) TRACTION CONTROL METHOD AND TRACTION CONTROL APPARATUS FOR VEHICLE

(71) Applicants: HYUNDAI MOTOR COMPANY, Seoul (KR); KIA CORPORATION, Seoul (KR)

(72) Inventors: Yoon Seong Jeon, Hwaseong-si (KR); Chung Hee Han, Hwaseong-si (KR); Sung Keun Lim, Hwaseong-si (KR); Jae Min Yun, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 364 days.

(21) Appl. No.: 17/552,951

(22) Filed: Dec. 16, 2021

(65) Prior Publication Data

US 2023/0039043 A1 Feb. 9, 2023

(30) Foreign Application Priority Data

Aug. 9, 2021 (KR) .......................... 10-2021-0104615

(51) Int. Cl.
*B60W 30/18* (2012.01)
*B60T 8/175* (2006.01)
(Continued)

(52) U.S. Cl.
CPC ....... *B60W 30/18172* (2013.01); *B60T 8/175* (2013.01); *B60W 10/06* (2013.01);
(Continued)

(58) Field of Classification Search
CPC ............... B60W 10/06; B60W 10/184; B60W 30/18172; B60W 2552/40;
(Continued)

(56) References Cited

U.S. PATENT DOCUMENTS 9,475,395 B2 10/2016 Beever et al.
9,834,219 B2 12/2017 Matsuno et al.
(Continued)

FOREIGN PATENT DOCUMENTS

JP 2014-204478 A 10/2014
JP 2015-020626 A 2/2015
(Continued)

*Primary Examiner* — Edwin A Young
(74) *Attorney, Agent, or Firm* — MORGAN, LEWIS & BOCKIUS LLP (57) ABSTRACT

A traction control method and a traction control apparatus for a vehicle are provided. The traction control method includes: estimating driving torque for each wheel and a difference between left and right wheel rotation speeds; determining a situation, in which the difference between the left and right wheel rotation speeds exceeds a first set value, to be a split wheel spin situation; estimating a maximum coefficient of friction between a spinning wheel and a road surface in the split wheel spin situation and estimating a maximum driving torque, at which the road surface is acceptable, by the maximum coefficient of friction; and obtaining a difference between driving torque of the spinning wheel and the maximum driving torque to calculate a road surface limitation excess driving torque and determining entry into traction control when the road surface limitation excess driving torque exceeds a second set value.

14 Claims, 5 Drawing Sheets

(51) Int. Cl.
B60W 10/06 (2006.01)
B60W 10/184 (2012.01)

(52) U.S. Cl.
CPC ... B60W 10/184 (2013.01); *B60W 2510/1005* (2013.01); *B60W 2510/105* (2013.01); *B60W 2520/266* (2013.01); *B60W 2520/28* (2013.01); *B60W 2520/30* (2013.01); *B60W 2552/40* (2020.02); *B60W 2720/26* (2013.01); *B60W 2720/30* (2013.01)

(58) Field of Classification Search
CPC ... B60W 2510/1005; B60W 2510/105; B60W 2520/266; B60W 2520/28; B60W 2520/30; B60W 2720/26; B60W 2720/30; B60T 8/175
See application file for complete search history.

(56) References Cited

U.S. PATENT DOCUMENTS

| | | | |
|---|---|---|---|
| 2004/0259684 A1* | 12/2004 | Kresse | B60W 10/06 477/115 |
| 2012/0277943 A1* | 11/2012 | Kim | B60W 30/20 903/903 |
| 2017/0183008 A1* | 6/2017 | Isono | B60W 30/18172 |
| 2018/0065619 A1* | 3/2018 | Kim | B60W 10/06 |
| 2018/0134156 A1 | 5/2018 | Nonaka et al. | |

FOREIGN PATENT DOCUMENTS

| | | |
|---|---|---|
| JP | 6031166 B1 | 11/2016 |
| JP | 2016-215902 A | 12/2016 |
| KR | 10-1344720 B1 | 12/2013 |

\* cited by examiner

TRACTION CONTROL METHOD AND TRACTION CONTROL APPARATUS FOR VEHICLE

CROSS-REFERENCE TO RELATED APPLICATION(S)

The present application claims the benefit of priority to Korean Patent Application No. 10-2021-0104615, filed on Aug. 9, 2021 in the Korean Intellectual Property Office, the entire disclosure of which is incorporated herein by this reference.

TECHNICAL FIELD

The present disclosure relates to a traction control method and a traction control apparatus for a vehicle, capable of overcoming a split wheel spin situation (a phenomenon in which among left and right wheels disposed on the same axis in a vehicle width direction, only one wheel spins) or a diagonal split wheel spin situation (a phenomenon in which among front right and left wheels of a vehicle and rear right and left wheels of the vehicle, only diagonally disposed wheels spin) which often occurs when the vehicle travels on terrain such as a mountain or a sandy hill.

BACKGROUND

In a traction control method according to the related art, wheel rotation speed is monitored to increase braking pressure when wheel spin occurs, and feedback control is performed to decrease braking pressure again when wheel spin is reduced.

That is, since the standard for entry and release of traction control is wheel spin, such a traction control method is not interested in whether a vehicle can drive on a rough road while generating appropriate driving force to a level thereof desired by a driver, and is based on whether wheel spin is appropriately maintained within a simply aimed set range.

In addition, the traction control method according to the related art is a method in which a wheel rotation speed is about 8% to about 10% higher than vehicle speed to prevent frequent entry and release and to maximize the grip of tires.

As described above, the traction control method according to the related art should always involve a certain level of wheel spin. Accordingly, when a vehicle travels on terrain such as a mountain or a sandy hill, it is difficult for the vehicle to pass through a rough road area while minutely and safely controlling driving force due to uneven road surfaces, cliffs, rocks, or the like.

The above descriptions regarding background technologies have been made only for enhancement of understanding of the background of the present disclosure, and are not to be deemed by those skilled in the art to correspond to already-know prior arts, and should not be taken as acknowledgment that this information forms any part of prior art.

SUMMARY

An aspect of the present disclosure is to provide a traction control method and a traction control apparatus for a vehicle, capable of applying appropriate brake torque to a wheel on a low-friction road surface, and allowing as much driving torque as desired by a driver to be transmitted to a wheel on a high-friction road surface.

According to an aspect of the present disclosure, a traction control method for a vehicle includes: estimating driving torque for each wheel transmitted from an engine and a difference between left and right wheel rotation speeds; determining a situation, in which the difference between the left and right wheel rotation speeds exceeds a first set value, to be a split wheel spin situation; estimating a maximum coefficient of friction between a spinning wheel and a road surface in the split wheel spin situation and estimating a maximum driving torque, at which the road surface is acceptable, by the maximum coefficient of friction; and obtaining a difference between driving torque of the spinning wheel and the maximum driving torque to calculate a road surface limitation excess driving torque and determining entry into traction control when the road surface limitation excess driving torque exceeds a second set value.

The traction control method may further include: monitoring a wheel slip ratio, calculated during driving, to determine whether wheel spin is occurring in each wheel.

The estimating driving torque may include: multiplying torque of the engine, in which an decrease in the torque of the engine is reflected, by a transmission ratio of a torque converter and a gear ratio of a transmission to calculate an output torque of the transmission; distributing the output torque of the transmission to a front differential gear and a rear differential gear depending on a magnitude of an all-wheel drive (AWD) torque and reflecting a final gear ratio to calculate torque of a corresponding differential gear; and estimating that half of torque of the differential gear is applied to each wheel.

In the estimating of the maximum driving torque, a coefficient of friction of a road surface and a vertical load of a wheel may be estimated, and the maximum driving torque may be estimated under an assumption that a coefficient of friction of the road surface in a moment, in which wheel spin occurs, is the maximum efficient of friction.

The vertical load of the wheel may be estimated through an equilibrium equation of force and a moment acting on a vehicle, and the coefficient of friction of the road surface may be estimated by an equation derived from an equilibrium equation of a moment acting on the wheel. In the moment in which wheel spin occurs, an angular acceleration of a wheel and a brake torque of the wheel may have a value of zero.

The traction control method may further include: calculating target brake torque corresponding to the road surface limitation excess driving torque when entering traction control, and applying braking pressure to the spinning wheel by the target brake torque.

The traction control method may further include: maintaining traction control until the difference between the left and right wheel rotation speeds is less than or equal to the first set value and a vehicle speed exceeds a third set value.

The target brake torque may be increased or decreased depending on an increased or decreased opening rate of an accelerator pedal.

According to another aspect of the present disclosure, a traction control apparatus for a vehicle includes: a signal input device configured to receive information, required for traction control, through an in-vehicle sensor; an estimation and calculation device, and a processor configured to estimate and calculate driving torque of each wheel, a maximum driving torque acceptable for a relatively low-friction road surface in a split wheel spin situation, and a road surface limitation excess driving torque of a wheel spinning over the maximum driving torque, based on the received information and vehicle dynamics; a determination device, and a processor configured to determine the split wheel spin situation based on a difference between left and right wheel rotation speeds estimated by the estimation and calculation device, and to determine whether to enter or not to enter traction control based on the road surface limitation excess driving torque; and a command device, and a processor configured to control a hydraulic control module connected to a brake, when the determination device determines entry into traction control, such that braking pressure, equivalent to target brake torque corresponding to the road surface limitation excess driving torque, is applied to the spinning wheel.

A wheel speed sensor may be installed in each wheel, the estimation and calculation device may detect a wheel rotation speed from the wheel speed sensor to estimate a vehicle speed, and the determination device may monitor a wheel slip ratio, calculated by the estimation and calculation device, during driving to determine whether wheel spin occurs.

When the determination device determines the split wheel spin situation, the estimation and calculation device may obtain a maximum coefficient of friction, a vertical load of a corresponding wheel, the maximum driving torque in which the maximum coefficient of friction is reflected, and a difference between driving torque of the spinning wheel and the maximum driving torque to estimate and calculate the road surface limitation excess driving torque. The maximum coefficient of friction is a coefficient of friction of the road surface in a moment in which wheel spin occurs.

The determination device may determine whether wheel spin is reduced and a vehicle speed is secured to have a predetermined level, and the command device may control the hydraulic control module to maintain braking pressure of a wheel on a low-friction road surface until the determination device determines to release traction control, depending on whether the vehicle speed is secured.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, the present disclosure will be described in detail with reference to example drawings. In adding reference numerals to components of each of the drawings, it should be noted that the same components are given the same reference numerals as possible even when they are indicated on different drawings.

The term used herein "vehicle" refers to various types of vehicle for transporting a human or an animal, an object, or the like, from an origin to a destination. Such a vehicle is not limited to vehicles travelling on a road or a track.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments. A singular expression includes a plural expression unless the context clearly indicates otherwise.

In the present disclosure, terms such as "include", "contain", "have", etc. should be understood as designating that features, numbers, steps, operations, elements, parts or combinations thereof exist and not as precluding the existence of or the possibility of adding one or more other features, numbers, steps, operations, elements, parts or combinations thereof in advance. In addition, when an element such as a layer, a film, a region, a substrate, etc. is referred to as being "on" another element, it can be "directly on" another element or an intervening element may also be present. Likewise, when an element such as a lawyer, a film, a substrate, etc. is referred to as being "under another element, it can be "directly under" another element or an intervening element may also be present.

Unless specified otherwise, all the numbers, values and/or expressions representing the amount of components, reaction conditions, polymer compositions or mixtures are approximations reflecting various uncertainties of measurement occurring in obtaining those values and should be understood to be modified by "about". Also, unless specified otherwise, all the numerical ranges disclosed in the present disclosure are continuous and include all the values from the minimum values to the maximum values included in the ranges. In addition, when the ranges indicate integers, all the integers from the minimum values to the maximum values included in the ranges are included unless specified otherwise.

In addition, the terms "front," "rear," "left," "right," and the like, used in relation to the direction are defined based on a vehicle or a vehicle body.

Figure 1:
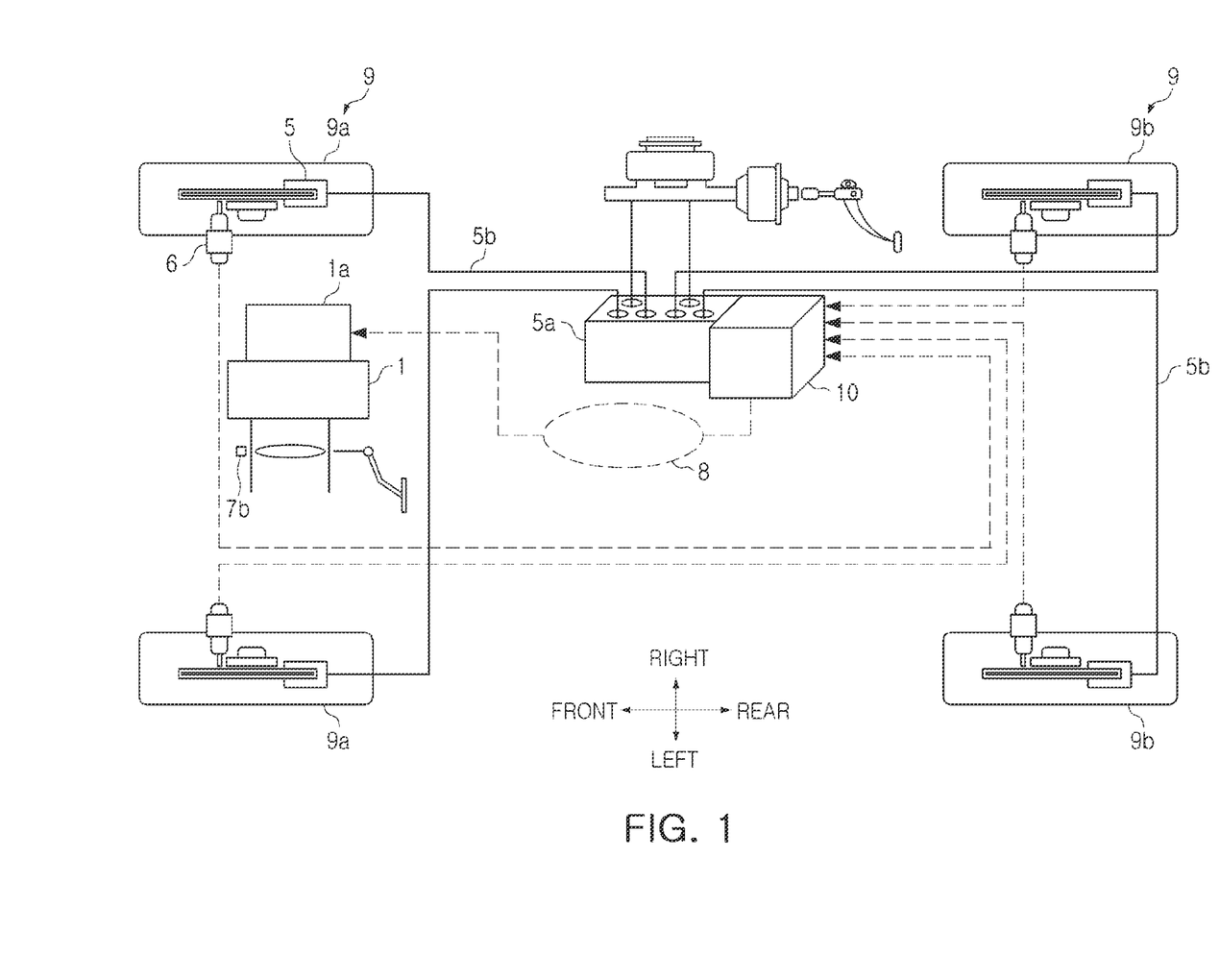
FIG. 1 is a configuration diagram of a vehicle to which a traction control apparatus according to the present disclosure is applied.

FIG. 1 is a configuration diagram of a vehicle to which a traction control apparatus according to the present disclosure is applied.

For ease of description, a description will be mainly provided for an example embodiment in which a traction control apparatus according to the present disclosure is installed in a vehicle employing, for example, all-wheel drive (AWD) and an automatic transmission, but application examples are not limited thereto.

For example, a traction control apparatus according to the present disclosure may even be applied to a vehicle employing front-wheel or rear-wheel drive of two-wheel drive 2WD and equipped with a manual transmission.

A vehicle may include a vehicle body provided with an engine 1, a transmission 2 (see FIG. 4), an AWD transfer 3 (see FIG. 4), differential gears 3*a* and 3*b*, a drive shaft, and a plurality of wheels 9.

An output of the engine 1 may be controlled by an engine management system (EMS) la and may be transmitted to the transmission 2. The transmission 2 may include a torque converter 2*a* (see FIG. 4), and transmission control may be performed by the transmission control module 2*b* (see FIG. 2).

The AWD transfer 3 may distribute and transmit driving force, input from the transmission 2, to a front differential gear 3*a* (see FIG. 4) and a rear differential gear 3*b* (see FIG.

Figure 4:
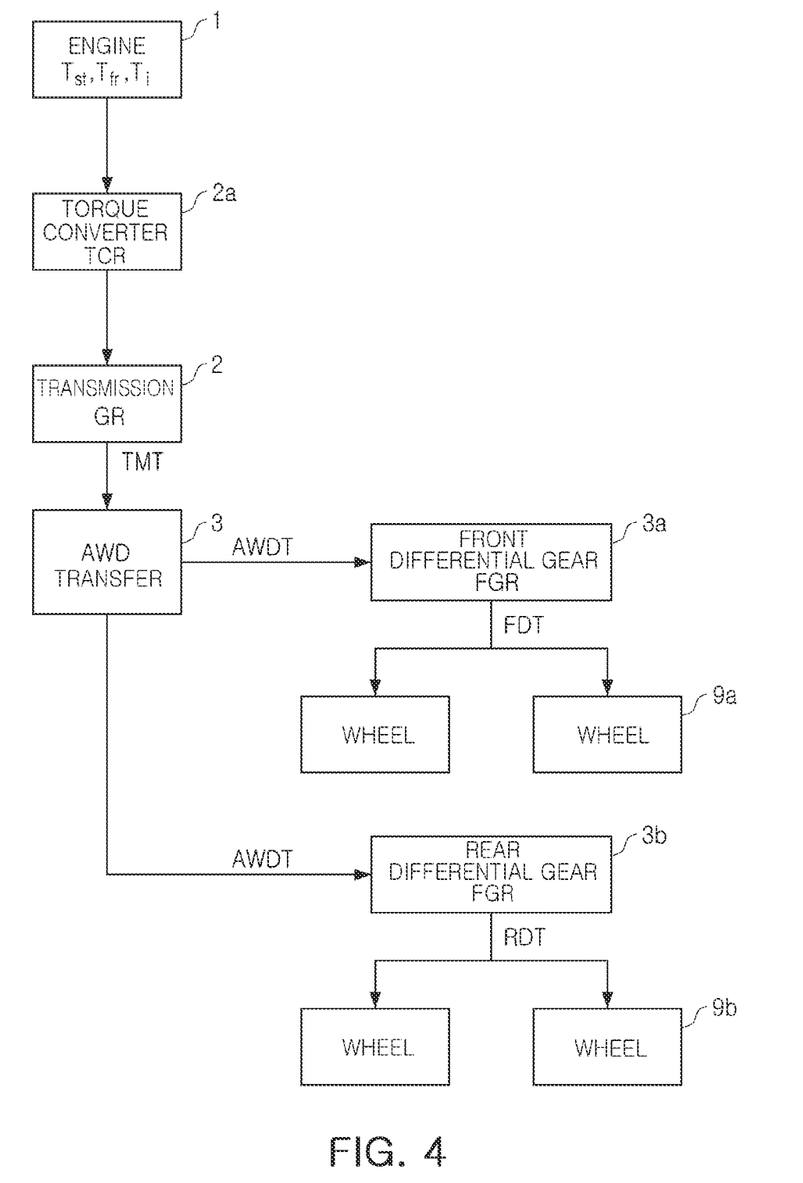
FIG. 4 is a diagram illustrating estimation of driving torque.

4). The AWD transfer 3 may adjust, for example, clamping force of a clutch such that driving force on a side of a front wheel 9a and a side of a rear wheel 9b is distributed up to a maximum of 50 to 50.

The driving force, transmitted from the engine 1 to the transmission 2, may rotate the entire wheel 9 through the AWD transfer 3, the drive shaft, and the differential gears 3a and 3b and may be transmitted to a road surface. A vehicle may include a pair of front wheels 9, for example, a left front wheel and a right front wheel, and a pair of rear wheels 9b, for example, a left rear wheel and a right rear wheel.

Also, the vehicle may include a brake 5 mounted on each of the wheels 9 to perform braking, a hydraulic control module 5a connected to the brake 5 to control a braking pressure applied to each of the wheels 9, a wheel speed sensor installed on each of the wheels 9 to detect a rotational speed (an angular speed) of a wheel, a traction control apparatus 10 receiving and calculating information from a sensor in the vehicle to perform traction control, and an in-vehicle local area network 8, as illustrated in FIG. 1.

Each of the wheels 9 may be provided with the brake 5, and the brake 5 may be connected to a hydraulic line 5b and the hydraulic control module 5a. The brake 5 may include, for example, a caliper, a friction pad, a disk, and the like, but exemplary embodiments are not limited thereto. The brake 5 may employ a drum-type brake.

The hydraulic control module 5a may include a pump and a valve block. A hydraulic pressure may be supplied through a pump operated by a motor, and the valve block may be provided with a plurality of solenoid valves for each hydraulic line 5b.

The hydraulic control module 5a may be connected to the traction control apparatus 10, allowing the pump to be operated by a signal input from the traction control apparatus 10. For example, the hydraulic control module 5a may control the hydraulic pressure, applied to the piston in the caliper, in a pressure increasing, pressure maintaining, or pressure decreasing mode.

In addition, each of the wheels 9 may be equipped with a wheel speed sensor 6 detecting a rotational speed of a wheel. A speed signal, detected by the wheel speed sensor 6, may be output to the traction control apparatus 10.

The traction control apparatus 10 may contain a processor configured to monitor a signal, transmitted from the wheel speed sensor 6 of each of the wheels 9, to estimate a vehicle speed and to determine whether wheel spin occurs.

The traction control apparatus 10 for a vehicle according to the present disclosure may contain a processor configured to check a difference between left and right wheel speeds. Then, when split wheel spin occurs, the traction control apparatus 10 may enter traction control to appropriately control target brake torque and driving torque of the wheel 9 such that the vehicle may stably start.

In this case, the traction control apparatus 10 may contain a processor configured to estimate how much target brake torque is required for which wheel 9, and the hydraulic control module 5a may control the motor and the solenoid valve of the pump to satisfy the estimated target brake torque. Accordingly, the traction control apparatus 10 may allow a braking pressure to be applied by the brake 5 to control a brake torque of a corresponding wheel.

The traction control apparatus 10 according to the present disclosure may be incorporated into or used in combination with an electronic control unit (ECU) of a vehicle.

For example, when control is required to increase or decrease the driving force of the engine 1, the electronic control unit of the vehicle may contain a processor configured to send a command to calculate appropriate driving force and to apply the calculated driving force to the engine management system 1a through the in-vehicle local area network 8, or the like. In addition, the electronic control unit may send a command to the transmission control module 2b to shift the transmission 2 to an appropriate shift stage.

As the in-vehicle local area network 8, a controller area network (CAN) may be used, but exemplary embodiments are not limited thereto. Any other communications network may be used, and a wired communications network may also be at least partially used.

Figure 2:
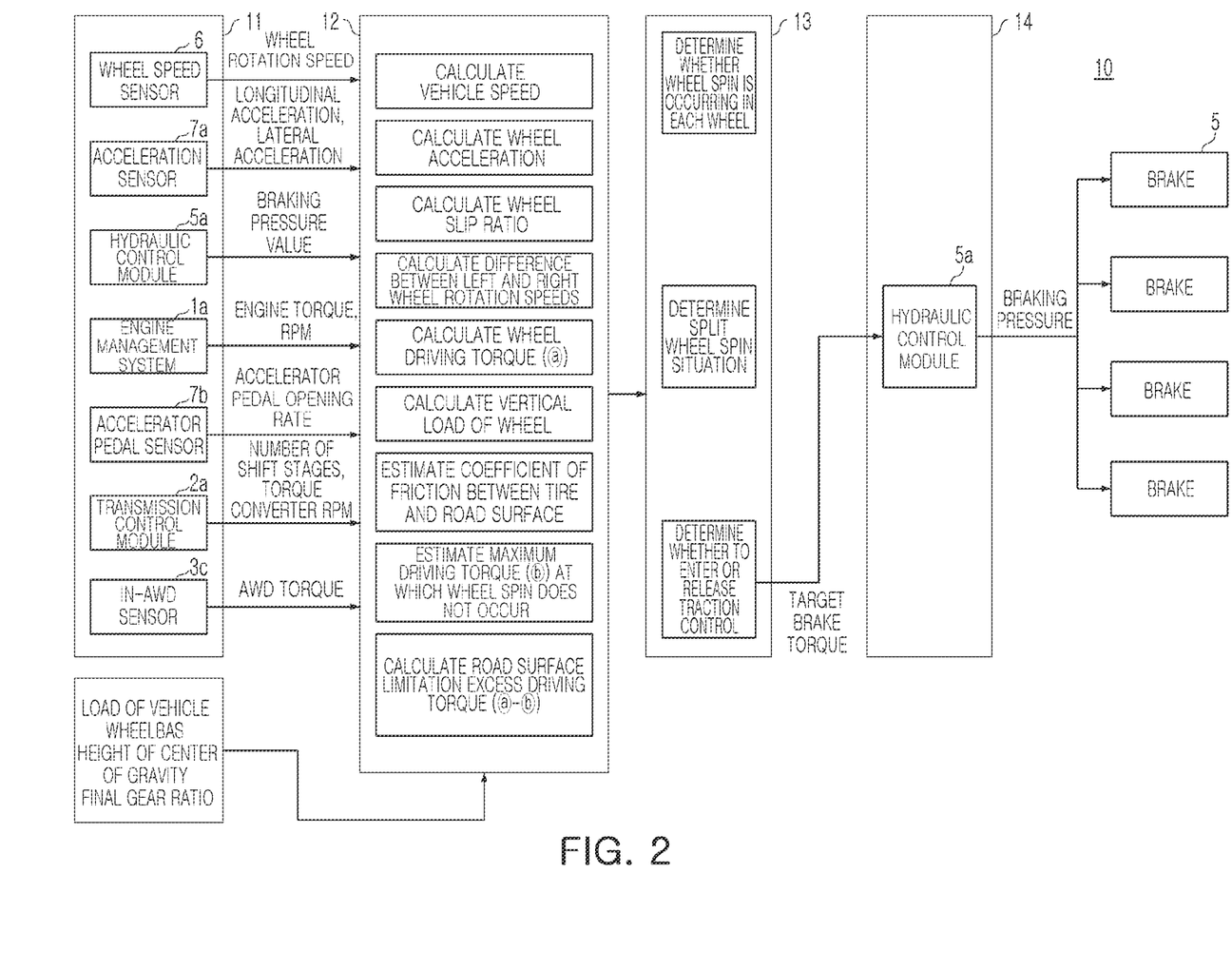
FIG. 2 is a configuration diagram of the traction control apparatus illustrated in FIG. 1.

FIG. 2 is a configuration diagram of the traction control apparatus illustrated in FIG. 1.

The traction control apparatus 10 for a vehicle according to the present disclosure may include a signal input device 11, an estimation and calculation device 12, a determination device 13, and a command device 14.

The signal input device 11 may receive information, required for traction control, through an in-vehicle sensor. The information input to the signal input device 11 may include, for example, a wheel rotation speed from the wheel speed sensor 6 of a wheel, longitudinal acceleration and lateral acceleration from an acceleration sensor 7a of a vehicle, a braking pressure value from the hydraulic control module 5a, an output torque and a revolutions per minute (RPM) of an engine from the engine management system 1a, an opening rate of an accelerator pedal from an accelerator pedal sensor (APS) 7b of the vehicle, the number of shift stages of the transmission 2 and an RPM of the torque converter 2a from the transmission control module 2b, and AWD torque from an ECU.

The estimation and calculation device 12 may include a processor configured to estimate or calculate a vehicle speed, wheel acceleration, a wheel slip rate, a difference between left and right wheel rotation speeds, driving torque for each wheel, a vertical load of a wheel, a coefficient of friction of a road surface, a maximum driving torque at which wheel spin does not occur on a road surface, a road surface limitation excess driving torque that exceeds a road surface limitation and causes wheel spin, and target brake torque of a wheel, based on the information received from the signal input device 11 and vehicle dynamics. The estimation and calculation device 12 according to an exemplary embodiment of the present disclosure may include a processor (e.g., computer, microprocessor, CPU, ASIC, circuitry, logic circuits, etc.). The processor may be implemented by a non-transitory memory storing, e.g., a program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s). The estimation and calculation device 12 may have an associated non-transitory memory storing software instructions which, when executed by the processor of the estimation and calculation device 12, provide a function for estimating and calculating data based on the information received from the signal input device 11 and vehicle dynamics. This will be described in detail later.

In addition, information such as a load of the vehicle, a wheelbase, a height of the center of gravity of the vehicle, a final gear ratio (FGR), and the like, may be basically input to the estimation and calculation device 12 in advance.

The determination device 13 may include a processor configured to monitor a wheel slip ratio of each of the wheels 9, during driving, based on the information calculated from the estimation and calculation device 12, to determine whether wheel spin occurs in a wheel and to determine a situation of split wheel spin caused by a difference between left and right wheel rotation speeds. The determination device 13 according to an exemplary embodiment of the present disclosure may include a processor (e.g., computer, microprocessor, CPU, ASIC, circuitry, logic circuits, etc.). The processor may be implemented by a non-transitory memory storing, e.g., a program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s). The determination device 13 may have an associated non-transitory memory storing software instructions which, when executed, provides a function for determining a situation of split wheel spin.

In addition, the determination device 13 may include a processor configured to determine entry into traction control by the road surface limitation excess driving torque calculated from the estimation and calculation device 12, and may determine release of traction control depending on whether the vehicle speed is secured. The determination device 13 may have an associated non-transitory memory storing software instructions which, when executed by the processor of the estimation and calculation device 12, provide a function for determining release of traction control.

The command device 14 may include a processor configured to send a command to the hydraulic control module 5a to apply braking pressure to the wheel 9 spinning by target brake torque calculated by the estimation and calculation device 12, based on the determination of the determination device 13. The hydraulic control module 5a may control a motor and a solenoid valve of a pump therein to operate a corresponding brake 5. The command device 14 according to an exemplary embodiment of the present disclosure may include a processor (e.g., computer, microprocessor, CPU, ASIC, circuitry, logic circuits, etc.). The processor may be implemented by a non-transitory memory storing, e.g., a program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor (s). The command device 14 may have an associated non-transitory memory storing software instructions which, when executed, sends a command to the hydraulic control module 5a.

Figure 3:
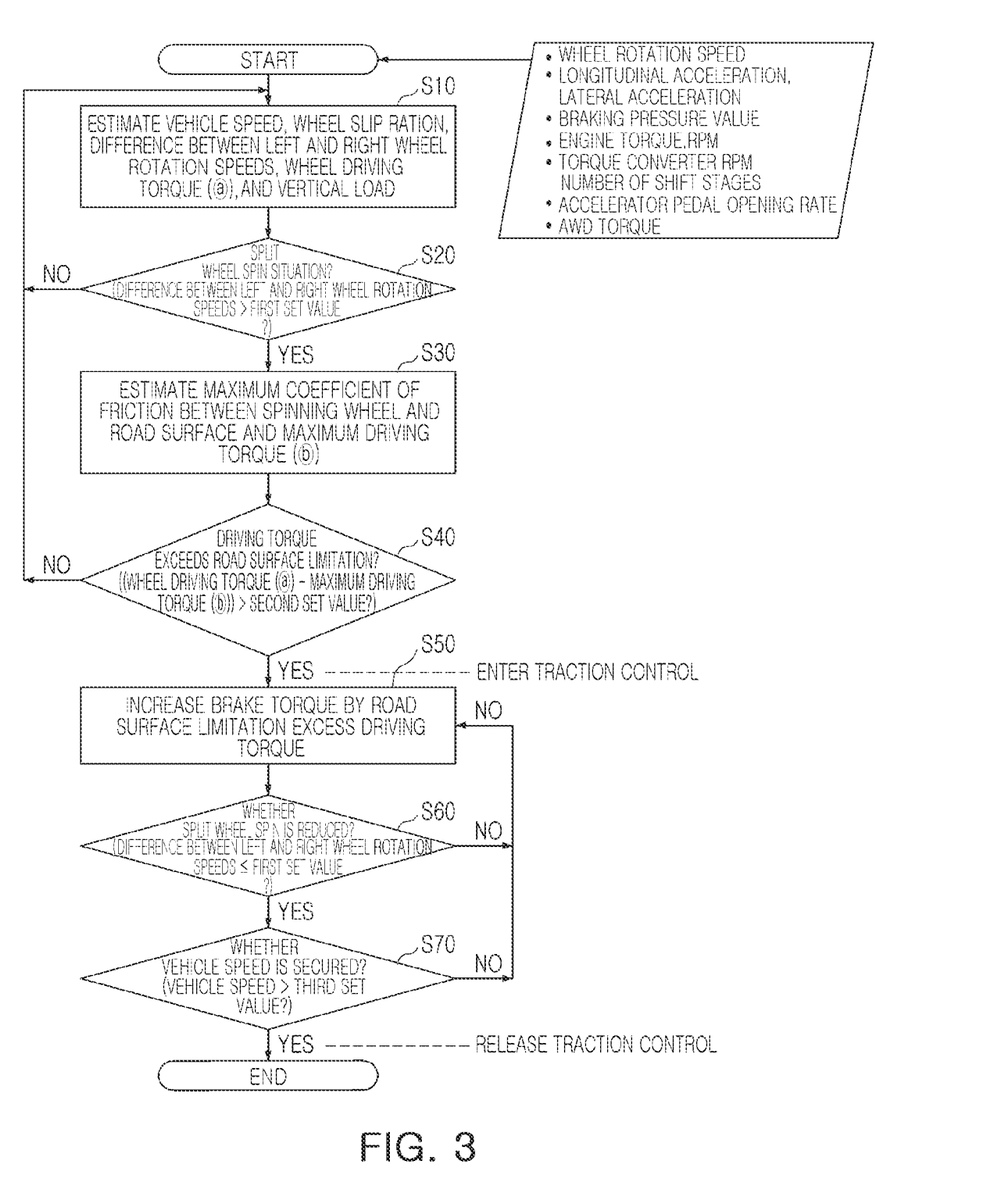
FIG. 3 is a flowchart illustrating a traction control method for a vehicle according to the present disclosure.

FIG. 3 is a flowchart illustrating a traction control method for a vehicle according to the present disclosure.

As illustrated in the drawing, the traction control method for a vehicle according to the present disclosure may include estimating driving torque $T_d$ of each wheel 9 transmitted from the engine 1 and a difference between left and right wheel rotation speeds (S10), determining a situation, in which the difference between the left and right wheel rotation speeds exceeds a first set value, to be a split wheel spin situation (S20), estimating a maximum coefficient of friction $\mu_{max}$ between a spinning wheel and a road surface in the split wheel spin situation and estimating a maximum driving torque $T_{d\_max}$, at which the road surface is acceptable, by the maximum coefficient of friction $\mu_{max}$, (S30), and obtaining a difference between driving torque of the spinning wheel and the maximum driving torque to calculate the road surface limitation excess driving torque $T_o$ and determining entry into traction control when the road surface limitation excess driving torque $T_c$ exceeds a second set value (S40).

When a vehicle starts driving, the signal input device 11 of the traction control apparatus 10 may include a processor configured to receive information, required for traction control, through an in-vehicle sensor and a communications network.

The information input to the signal input device 11 may include, for example, a wheel rotation speed from the wheel speed sensor 6 of a wheel, longitudinal acceleration and lateral acceleration from an acceleration sensor 7a of a vehicle, a braking pressure value from the hydraulic control module 5a, an output torque and a revolutions per minute (RPM) of an engine from the engine management system 1a, an opening rate of an accelerator pedal from an accelerator pedal sensor (APS) 7b of the vehicle, the number of shift stages of the transmission and an RPM of the torque converter 2a from the transmission control module 2b, and AWD torque from an ECU.

Next, the estimation and calculation device 12 may include a processor configured to estimate a vehicle speed, wheel acceleration, a wheel slip ratio, a difference between left and right wheel rotation speeds, driving torque $T_d$ for each wheel, and a vertical load $F_n$ of the wheel, based on the information received from the signal input device 11 and vehicle dynamics (S10).

For example, the estimation and calculation device 12 may detect a wheel rotation speed from a wheel speed sensor and estimate a vehicle speed based on the detected wheel rotation speed. In addition, the estimation and calculation device 12 may differentiate the wheel rotation speed to estimate wheel acceleration.

The wheel slip ratio refers to the degree of slip occurring between a tire and a road surface, and is expressed in percentage by dividing the difference between the wheel speed and the vehicle speed by the vehicle speed. The determination device 13 may monitor the wheel slip ratio, calculated by the estimation and calculation device 12, during driving to determine whether wheel spin occurs in the wheel 9.

The estimation and calculation device 12 may calculate a difference between the wheel rotation speed, detected from the wheel speed sensor 6 of the left wheel of the vehicle, and the wheel rotation speed, detected from the wheel speed sensor 6 of the right wheel of the vehicle, to obtain a difference between left and right wheel rotation speeds.

Further, the estimation and calculation device 12 may estimate the driving torque $T_d$ transmitted to each wheel 9.

FIG. 4 is a diagram illustrating estimation of driving torque.

Information of a maximum torque $T_{st}$ of the engine 1 may be input to the estimation and calculation device 12 in advance. In addition, a friction torque $T_{fr}$ of the engine 1, an inherent test value of the engine 1, and a transmission ratio TCR, efficiency of the torque converter 2a, may be input to the estimation and calculation device 12 in advance.

An output torque $T_i$ of the engine 1 from the engine management system 1a and a gear ratio GR in a corresponding shift stage of the transmission 2 from the transmission control module 2b may be input to the signal input device 11. The signal input device 11 may provide such information to the estimation and calculation device 12.

The estimation and calculation device 12 may calculate an output torque TMT of the transmission 2, output from the transmission 2, from the input information by multiplying, for example, torque of the engine 1, on which a torque reduction of the engine 1 is reflected, by a transmission ratio TCR of the torque converter 2a and a gear ratio GR of the transmission 2. That is, the output torque TMT of the transmission 2 may be calculated by the following equation 1.

$$TMT = \left[\left(\frac{Ti - Tfr}{100}\right) \times Tst\right] \times TCR \times GR \quad \text{Equation 1}$$

A final reduction gear ratio FGR may be reflected in the calculated output torque TMT of the transmission 2 to calculate torques of the differential gears 3a and 3b.

In addition, the output torque TMT of the transmission 2 may be distributed to a front wheel 9a and a rear wheel 9b depending on the magnitude of an AWD torque AWDT. Hereinafter, a description will be provided for the case in which a front wheel is a main driving wheel.

The AWD torque AWDT may be a torque for compressing a (electronic) clutch in the AWD transfer 3, and may have an inherent test value determined depending on the compression of the clutch. According to a driving situation, the AWD transfer 3 may receive a command to compress the clutch at an appropriate level, from an ECU, and information of a corresponding AWD torque may be input to the signal input device 11.

For example, when the AWD torque AWDT is 50% or more of the output torque TMT of the transmission 2, a torque FDT of the front differential gear 3a and a torque RDT of the rear differential gear 3b may be calculated by the following equation 2 by reflecting the final reduction gear ratio FGR.

$$FDT = 0.5 \times TMT \times FGR$$

$$RDT = 0.5 \times TMT \times FGR \quad \text{Equation 2}$$

In this case, only 50% of the output torque TMT of the transmission 2 may be transmitted to the rear differential gear 3b. That is, a maximum torque which may be transmitted to the rear differential gear 3b of the rear wheel 9b corresponding to an auxiliary driving wheel may be 50% of the output torque TMT of the transmission 2.

Accordingly, half of the torques FDT and RDT of the corresponding differential gears 3a and 3b may be estimated to be applied to each wheel 9 as driving torque $T_d$.

On the other hand, when the AWD torque AWDT is less than 50% of the output torque TMT of the transmission 2, the torque FDT of the front differential gear 3a and the torque RDT of the rear differential gear 3b may be calculated by the following equation 3 by reflecting the final reduction gear ratio FGR.

$$FDT = (TMT - AWDT) \times FGR$$

$$RDT = AWDT \times FGR \quad \text{Equation 3}$$

As described above, when the AWD torque AWDT is less than 50% of the output torque TMT of the transmission 2, only an amount corresponding to the AWD torque may be transmitted to the rear differential gear 3b, an auxiliary drive wheel side. In addition, a torque excluding the torque transmitted to the rear differential gear 31a may be transmitted to the front differential gear 3a, a main driving wheel side.

Similarly, half of the torques FDT and RDT of the corresponding differential gears 3a and 3b may be estimated to be applied to each wheel 9 as driving torque $T_d$.

Figure 5:
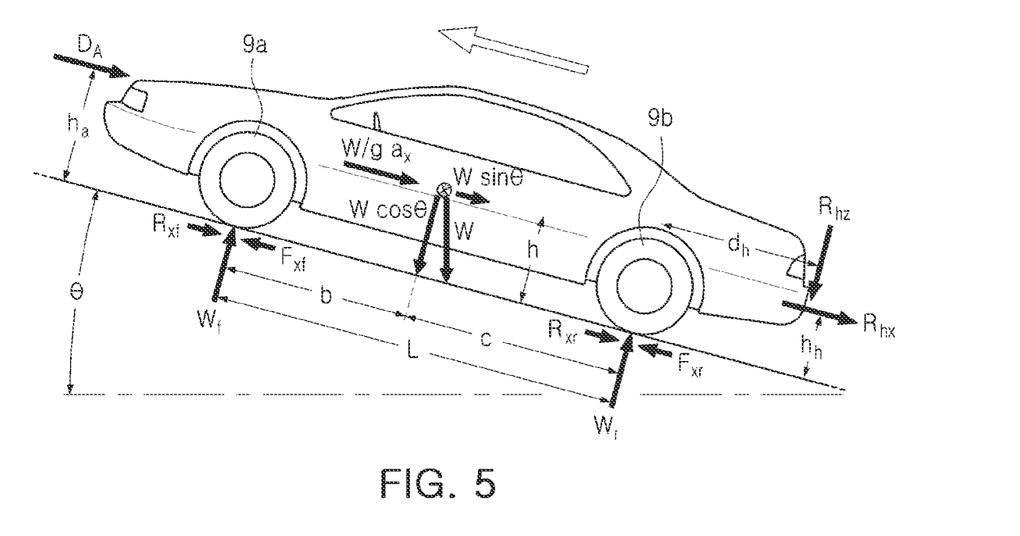
FIG. 5 is a diagram illustrating estimation of normal force with respect to a wheel.

In addition, the estimation and calculation device 12 may estimate a vertical load $F_n$ acting on each wheel 9. Since the vertical load has the same magnitude as normal force but is opposite in direction to the normal force, the vertical load may be estimated from the normal force. FIG. 5 is a diagram illustrating estimation of normal force for a wheel.

At material points at which the front wheel 9a and the rear wheel 9b of the vehicle are in contact with a road surface, inertial force equivalent to the acceleration force may act in an opposite direction, and a sum of rotational moments M at the material points should always be zero and equilibrium. That is, ΣM=0.

For example, when the vehicle climbs a slope (θ>0) while performing traction, normal force of each wheel may be estimated through an equilibrium equation of a moment and force acting on the vehicle in a position in which the tire and the road surface are in contact with each other. The normal force acting on the front wheel 9a is represented by $W_f$, and the normal force acting on the rear wheel 9b is represented denoted by $W_r$.

The normal forces may be calculated by the following equation 4.

$$W_f = \frac{1}{L}\left\{Wc\cos\theta - Wh\sin\theta - R_{hx}h_h - R_{hz}d_h - \frac{W}{g}a_xh - D_Ah_a\right\} \quad \text{Equation 4}$$

$$W_r = \frac{1}{L}\left\{Wb\cos\theta - Wh\sin\theta + R_{hx}h_h + R_{hz}(d_h + L) + \frac{W}{g}a_xh + D_Ah_a\right\}$$

where $W_f$ is the normal force against the load of the vehicle acting on the front wheel 9a, $W_r$ is the normal force against the load of the vehicle acting on the rear wheel 9b, L is a wheelbase of the vehicle, W is a weight of the vehicle acting on the center of gravity, g is acceleration of gravity, $a_x$ is the acceleration of the vehicle, h is a shortest distance from a road surface to the center of gravity of the vehicle, b is a distance from a virtual point, contacted by extending from the center of gravity of the vehicle to the road surface by a shortest distance, to a contact point between a front wheel and the road surface, c is a distance from the virtual point, contacted by extending from the center of gravity of the vehicle to the road surface by a shortest distance, to a contact point between a rear wheel and the road surface, θ is an angle of inclination of the road surface, $D_A$ is air resistance, $h_a$ is an effective height at which the air resistance acts and is applied to a front portion of the vehicle, $h_h$ is an effective height at which traction force acts and is applied to a rear portion of the vehicle, $d_h$ is an effective length from the contact point between the rear wheel and the road surface to a point on which the traction force acts, $R_{hx}$ is traction force acting in a length direction of the vehicle, and $R_{hz}$ is traction force acting at a right angle to an axis of the vehicle in the length direction.

In addition, in FIG. 5, reference symbol $F_{xf}$ is driving force acting on the front wheel 9a, reference symbol $F_{xr}$ is driving force acting on the rear wheel 9b, reference symbol $R_{xf}$ is rolling resistance acting on the front wheel 9a, and reference symbol $R_{xr}$ is rolling resistance acting on the rear wheel 9b.

When traction is not performed, $R_{hx}$ and $R_{hz}$ in Equation 4 have a value of zero. When the vehicle is in a stopped state, $a_x$ and $D_A$ may have a value of zero.

The angle θ of inclination of the road surface may be estimated from the longitudinal acceleration detected from the acceleration sensor 7a of the vehicle.

As described above, the estimation and calculation device 12 may process information required to determine the entry into traction control and to calculate a control amount.

Next, when the difference between the left and right wheel rotation speeds is increased to exceed a certain level, for example, a predetermined first set value during driving, the determination device 13 may determine such a situation to be a split wheel spin situation (S20), and the estimation and calculation device 12 may start various calculations for preparing traction control.

The estimation and calculation device 12 may estimate the maximum coefficient of friction $\mu_{max}$ between the spinning wheel 9 and the road surface and may estimate the maximum driving torque $T_{d\_max}$, acceptable by the road surface, by the maximum coefficient of friction (S30).

To this end, the coefficient of friction of the road surface in a moment in which wheel spin occurs may be estimated, and the vertical load $F_n$ of the corresponding wheel 9 may be used. The vertical load may have the same magnitude as the above-described normal force, but may be opposite in direction to the normal force.

Figure 6:
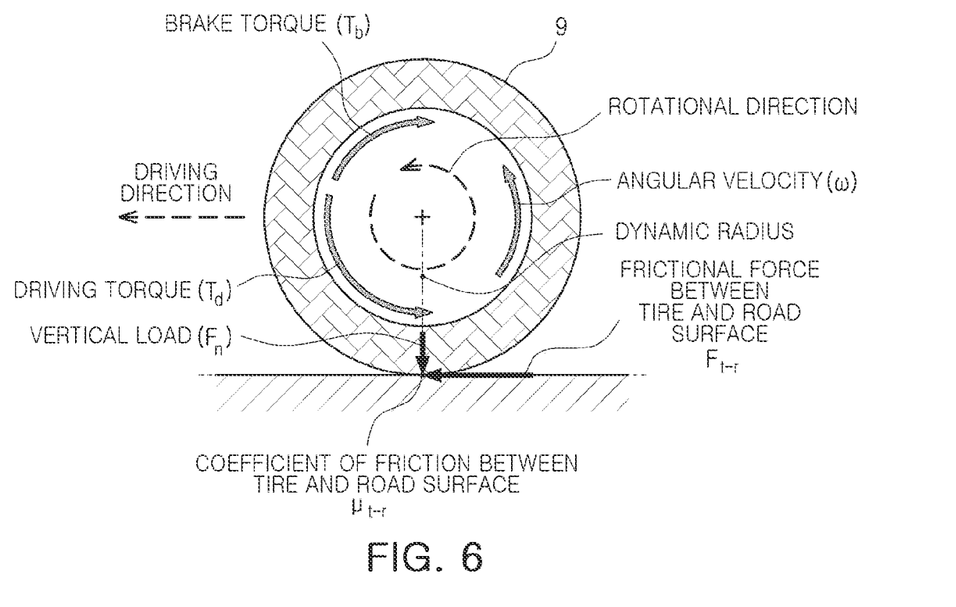
FIG. 6 is a diagram illustrating wheel dynamics.

The coefficient of friction of the road surface may be calculated by wheel dynamics derived from an equilibrium equation of a moment acting on the wheel 9. FIG. 6 is a diagram illustrating wheel dynamics. An equilibrium equation of a moment acting on a wheel may be given by the following equation $$I\frac{d\omega}{dt} = T_d - T_b - F_{t-r}R = T_d - T_b - \mu_{t-r}F_nR \qquad \text{Equation 5}$$

where I is a moment of inertia of the wheel 9, $$\frac{d\omega}{dt}$$

is an angular acceleration of the wheel 9, $T_d$ is driving torque of the wheel 9, $T_b$ is a brake torque of the wheel 9, $F_{t-z}$ is frictional force between the tire and the road surface, $F_n$ is a vertical load, R is a dynamic radius of the tire, and $\mu_{t-r}$ is a coefficient of friction of the road surface.

To summarize Equation 5, an arithmetic expression of the coefficient of friction of the road surface may be defined by the following equation 6.

$$\mu_{t-r} = \frac{T_d - T_b - I\frac{d\omega}{dt}}{F_nR} \qquad \text{Equation 6}$$

When the driving force of the vehicle is lost due to wheel spin of the wheel 9 on a relatively low-friction road surface under split road surface conditions, that is, in a moment at which wheel spin occurs, the angular acceleration $$\frac{d\omega}{dt}$$

of the wheel 9 may be zero. Also, the brake torque may have a value of zero in the moment in which wheel spin occurs.

Accordingly, the coefficient of friction $\mu_{t-r}$ of the road surface in the moment in which wheel spin occurs may be assumed to be a maximum coefficient of friction $\mu_{max}$ on a corresponding road surface.

In this case, the driving torque may be referred to as a maximum driving torque $T_{d\_max}$ of the road surface preventing wheel spin from occurring. Accordingly, a maximum driving torque of a level, on which a corresponding road surface may withstand so as to prevent wheel spin from occurring, may be defined by the following equation 7.

$$T_{d\_max} = \mu_{max}F_nR \qquad \text{Equation 7}$$

When the maximum driving torque $T_{d\_max}$, at which the vehicle can travel without wheel spin, is calculated from friction characteristics of the road surface, a value of the driving torque that exceeds a road surface limitation and causes wheel spin may be calculated.

In the traction control method for a vehicle according to the present disclosure, a difference between the driving torque $T_d$ of the spinning wheel 9 and the maximum driving torque $T_{d\_max}$ may be obtained and will be referred to as a road surface limitation excess driving torque $T_o$. Specifically, the road surface limitation excess driving torque $T_o$ may be defined by the following equation 8.

$$T_o = T_d - \mu_{max}F_nR \qquad \text{Equation 8}$$

Next, when the road surface limitation excess driving torque $T_o$ exceeds a predetermined level, for example, a predetermined second set value, the determination device 13 may determine the entry into traction control (S40).

According to the determination of the determination device 13, the command device 14 may send a command to the hydraulic control module 5a to apply a target control torque $T_{b\_tar}$, having the same level as the road surface limitation excess driving torque $T_o$ calculated by the estimation and calculation device 12, to the wheel 9 spinning on the low-friction road surface. In other words, braking pressure may be applied to the spinning wheel 9 through the hydraulic control module 5a and the brake 5 to increase target brake torque $T_{b\_tar}$ by the road surface limitation excess driving torque $T_o$ (S50).

The target brake torque $T_{b\_tar}$ may be calculated by the following equation 9, and a gain is a parameter for tuning actual performance.

$$T_{b\_tar} = \text{gain} \times (T_d - \mu_{max}F_nR) \qquad \text{Equation 9}$$

As described above, the target brake torque $T_{b\_tar}$ may be applied to the wheel 9, spinning on the low-friction road surface, and then increased by the road surface limitation excess driving torque $T_o$, so that wheel spin may not occur or at least wheel spin may be reduced on the low-friction road surface.

At the same time, when a brake torque (artificial frictional force of the road surface) is applied to one wheel 9, the same amount of driving torque may be transmitted to the wheel on a high-friction road surface according to structural characteristics of an open differential gear. Therefore, the vehicle may be moved in a split wheel spin situation.

The target brake torque $T_{b\_tar}$ may be increased or decreased as an opening rate of the accelerator pedal is increased or decreased. For example, as the opening rate of the accelerator pedal is increased, an output torque $T_i$ of the engine 1 may be increased, and thus, the estimated driving torque $T_d$ may also be increased. As a result, the road surface limitation excess driving torque $T_o$ may be increased, thereby increasing the target brake torque $T_{b\_tar}$.

Therefore, according to the above-described traction control method for a vehicle, when a driver adjusts the accelerator pedal, driving torque may be transmitted to the wheel 9 on the high-friction road surface while reducing wheel spin of the wheel 9 on the low-friction road surface, so that the vehicle may easily escape from a split road surface.

In addition, the determination device 13 may determine to release traction control, depending on whether the vehicle speed is secured.

To this end, the determination device 13 may check whether the difference between the left and right wheel rotation speeds is less than or equal to the first set value after the reduction of wheel spin, thereby monitoring whether the split wheel spin situation is resolved (S60).

The command device 14 may not directly reduce or release braking pressure of the wheel 9 on the low-friction road surface so as to continuously transmit the driving torque to the wheel 9 on the high-friction road surface even when wheel spin is reduced. The command device 14 may maintain traction control until the vehicle speed is secured to be higher an appropriate level.

When the vehicle speed exceeds a certain level, for example, a predetermined third set value, the determination device 13 may determine to release traction control (S70). In other words, the determination device 13 may determine that the split wheel spin situation is resolved and the vehicle is traveling at an appropriate speed, thereby releasing traction control.

The command device 14 may transmit a command to the hydraulic control module 5a to release the braking pressure for the wheel 9 on the low-friction road surface, based on the determination of the determination device 13. Thus, traction control may end.

In the above-described traction control method for a vehicle, when a driver adjusts an accelerator pedal to minutely adjust a vehicle speed, target brake torque may be increased or decreased depending on an increased or decreased opening rate of the accelerator pedal. Therefore, wheel spin may not occur, and driving torque as much as target brake torque added by reflecting the driver's driving intention may be appropriately transmitted to a wheel on a high-friction road surface.

Therefore, according to the above-described traction control apparatus and traction control method for a vehicle, even when wheel spin is reduced, traction control may not end and may be maintained until a vehicle speed is secured at a certain level. Thus, wheel spin may be prevented from reoccurring and stable driving may be achieved even on a split road surface.

In addition, according to the above-described traction control apparatus and traction control method for a vehicle, when the driver increases or decreases an opening rate of the accelerator pedal according to a driving situation, braking pressure of the wheel on the low-friction road surface may be increased or decreased together, and thus, the vehicle may travel at a desired vehicle speed even under traction control.

As described above, according to an example embodiment, a relationship between driving force of a vehicle and frictional force of a road surface may be analyzed to appropriately apply a brake torque having a level, on which wheel spin does not occur, to a wheel. Therefore, wheel spin having a predetermined level may be stably maintained without being repeatedly increased or decreased, and a vehicle may minutely travel even when climbing on a sloped split road surface (a road surface having a great difference in coefficients of friction on left and right of the vehicle).

In addition, according to an example embodiment, a brake torque may be appropriately increased to prevent wheel spin from occurring in a wheel on a low-friction road surface and driving torque, equivalent to an input of an acceleration pedal increased by a driver, may be transmitted to a wheel on a high-friction road surface. Thus, the driver's driving intention may be reflected, and driving may be smoothly performed as compared with the related art, so that better traction control and driving stability may be secured on an unpaved road surface.

In addition, according to an example embodiment, wheel spin may be prevented only by improving a control logic in the same specification without an increase in separate costs caused by addition or modification of hardware, and a vehicle may pass through a rough road even under road surface conditions, in which the vehicle cannot escape due to excessive wheel spin and lack of driving force. As a result, vehicle marketability may be improved.

As described above, while experimental examples and exemplary embodiments of the present disclosure have been shown and described in connection with what is presently considered to be practical embodiments, it will be apparent and understood to those skilled in the art that modifications and variations could be made without departing from the scope of the present disclosure as defined by the appended claims, but, on the contrary, is intended to cover various modifications and equivalent arrangements.

What is claimed is:

1. A traction control method for a vehicle, the traction control method comprising steps of:
   estimating, by a processor, driving torque for each wheel transmitted from an engine and a difference between left and right wheel rotation speeds;
   determining, by a processor, a situation, in which the difference between the left and right wheel rotation speeds exceeds a first set value, to be a split wheel spin situation;
   estimating, by a processor, a maximum coefficient of friction between a spinning wheel and a road surface in the split wheel spin situation and estimating a maximum driving torque, at which the road surface is acceptable, by the maximum coefficient of friction; and
   obtaining, by a processor, a difference between driving torque of the spinning wheel and the maximum driving torque to calculate a road surface limitation excess driving torque and determining entry into traction control when the road surface limitation excess driving torque exceeds a second set value.

2. The traction control method of claim 1, further comprising:
   monitoring, by a processor, a wheel slip ratio, calculated during driving, to determine whether wheel spin is occurring in each wheel.

3. The traction control method of claim 1, wherein the estimating driving torque comprises:
   multiplying torque of the engine, in which a decrease in the torque of the engine is reflected, by a transmission ratio of a torque converter and a gear ratio of a transmission to calculate an output torque of the transmission;
   distributing the output torque of the transmission to a front differential gear and a rear differential gear depending on a magnitude of an all-wheel drive (AWD) torque and reflecting a final gear ratio to calculate torque of a corresponding differential gear; and
   estimating that half of torque of the differential gear is applied to each wheel.

4. The traction control method of claim 3, wherein when the AWD torque is 50% or more of the output torque of the transmission, torque of the front differential gear and torque of the rear differential gear are calculated by the following equation 1, $$FDT = 0.5 \times TMT \times FGR,$$

$$RDT = 0.5 \times TMT \times FGR \qquad [\text{Equation 1}]$$

where FDT is the torque of the front differential gear, RDT is the torque of the rear differential gear, TMT is the output torque of the transmission, and FGR is the final gear ratio.

5. The traction control method of claim 3, wherein when the AWD torque is less than 50% of the output torque of the transmission, torque of the front differential gear and torque of the rear differential gear are calculated by the following equation 2, $$FDT=(TMT-AWDT)\times FGR,$$

$$RDT=AWDT-FGR \quad \text{[Equation 2]}$$

where FDT is the torque of the front differential gear, RDT is the torque of the rear differential gear, TMT is the output torque of the transmission, AWDT is an AWD torque, and FGR is the final gear ratio.

6. The traction control method of claim 1, wherein in the step of estimating the maximum driving torque, a coefficient of friction of a road surface and a vertical load of a wheel are estimated, and the maximum driving torque is estimated by the following equation 3 under an assumption that a coefficient of friction of the road surface in a moment, in which wheel spin occurs, is the maximum coefficient of friction, $$T_{d\_max}=\mu_{max}F_n R \quad \text{[Equation 3]}$$

where $T_{d\_max}$ is the maximum driving torque, $\mu_{max}$ is the maximum coefficient of friction, $F_n$ is the vertical load, and R is a dynamic radius of a tire.

7. The traction control method of claim 6, wherein the vertical load of the wheel is estimated through an equilibrium equation of force and a moment acting on a vehicle, and the coefficient of friction of the road surface is estimated by the following equation 4 derived from an equilibrium equation of a moment acting on the wheel, $$\mu_{t-r} = \frac{T_d - T_b - I\frac{d\omega}{dt}}{F_n R} \quad \text{[Equation 4]}$$

where I is a moment of inertia of the wheel, $\frac{d\omega}{dt}$ is an angular acceleration of the wheel, $T_d$ is driving torque of the wheel, $T_b$ is a brake torque of the wheel, $F_{t-r}$ is frictional force between a tire and the road surface, and $F_n$ is a vertical load, R is a dynamic radius of the tire, and $\mu_{t-r}$ is a coefficient of friction of the road surface, and wherein in the moment in which wheel spin occurs, the angular acceleration of the wheel and the brake torque of the wheel have a value of zero.

8. The traction control method of claim 1, further comprising:

calculating, by a processor, target brake torque corresponding to the road surface limitation excess driving torque when entering traction control, and applying braking pressure to the spinning wheel by the target brake torque.

9. The traction control method of claim 8, further comprising:

maintaining traction control until the difference between the left and right wheel rotation speeds is less than or equal to the first set value and a vehicle speed exceeds a third set value.

10. The traction control method of claim 8, wherein the target brake torque is increased or decreased depending on an increased or decreased opening rate of an accelerator pedal.

11. A traction control apparatus for a vehicle, the traction control apparatus comprising:

a signal input device, comprising a processor configured to receive information, required for traction control, through an in-vehicle sensor;

an estimation and calculation device, comprising a processor configured to estimate and calculate driving torque of each wheel, a maximum driving torque acceptable for a relatively low-friction road surface in a split wheel spin situation, and a road surface limitation excess driving torque of a wheel spinning over the maximum driving torque, based on the received information and vehicle dynamics;

a determination device, comprising a processor configured to determine the split wheel spin situation based on a difference between left and right wheel rotation speeds estimated by the estimation and calculation device, and to determine whether to enter or not to enter traction control based on the road surface limitation excess driving torque; and a command device, comprising a processor configured to control a hydraulic control module connected to a brake, when the determination device determines entry into traction control, such that braking pressure, equivalent to target brake torque corresponding to the road surface limitation excess driving torque, is applied to the spinning wheel.

12. The traction control apparatus of claim 11, wherein a wheel speed sensor is installed in each wheel, the estimation and calculation device detects a wheel rotation speed from the wheel speed sensor to estimate a vehicle speed, and the determination device monitors a wheel slip ratio, calculated by the estimation and calculation device, during driving to determine whether wheel spin occurs.

13. The traction control apparatus of claim 12, wherein when the determination device determines the split wheel spin situation, the estimation and calculation device obtains a maximum coefficient of friction, a vertical load of a corresponding wheel, the maximum driving torque in which the maximum coefficient of friction is reflected, and a difference between driving torque of the spinning wheel and the maximum driving torque to estimate and calculate the road surface limitation excess driving torque, the maximum coefficient of friction being a coefficient of friction of the road surface in a moment in which wheel spin occurs.

14. The traction control apparatus of claim 13, wherein the determination device determines whether wheel spin is reduced and a vehicle speed is secured to have a predetermined level, and the command device controls the hydraulic control module to maintain braking pressure of a wheel on a low-friction road surface until the determination device determines to release traction control, depending on whether the vehicle speed is secured.

* * * * *